3,666,416
MAGNESIUM HYDRIDE PRODUCTION
Walter K. Henle, Orinda, and Edgar J. Smutny, San Francisco, Calif., assignors to Shell Oil Company, New York, N.Y.
No Drawing. Filed Nov. 25, 1970, Ser. No. 92,900
Int. Cl. C01b 6/04
U.S. Cl. 23—204          6 Claims

ABSTRACT OF THE DISCLOSURE

Magnesium hydride having high-surface area and high-chemical activity is produced by hydrogenating a mixture of magnesium and a conjugated diene in the presence of tetrahydrofuran.

BACKGROUND OF THE INVENTION

Magnesium hydride was first prepared by Jolibois, Compt. Rend., 155, 353 (1912) by the pyrolysis of ethylmagnesium iodide and later by Wiberg et al., Z. Naturforsch., 5b, 396 (1950) by the pyrolysis of dialkylmagnesium, compounds. However, the yields were low and the quality of the hydride poor. Magnesium hydride of about 60% purity has been prepared by Wiberg et al., Z. Naturforsch., 6b, 394 (1951) by the direct hydrogenation of metallic magnesium, it being necessary in this reaction to utilize a high pressure of hydrogen (200 atmospheres), a high temperature (570° C.), and a catalyst (magnesium iodide). Barbaras et al., J. Am. Chem. Soc., 73, 4589 (1951), obtained magnesium hydride of purity averaging about 75% by the treatment of diethylmagnesium with lithium aluminum hydride. Thereafter, it was shown by Ellinger et al., J. Am. Chem. Soc., 77, 2647 (1955) that magnesium hydride could be obtained from its elements in higher yields without a catalyst at lower temperatures and pressures. The hydride so produced was bluish-gray in color and generally unreactive to water; see also Faust et al., J. Appl. Chem. (London), 10, 187 (1960). Presently, high yields of somewhat more reactive magnesium hydride are obtained by heating magnesium with iodine at 380° to 450° C. at an initial hydrogen pressure of 100–200 kg. cm.$^{-2}$ with continuous grinding in a ball mill; see, for example, Dymova et al., Russ. J. Inorg. Chem., 6, 392 (1961). In "Handbook of Organometallic Compounds," N. Hagihara, ed., 46, Benjamin, New York, 1968, is reported that magnesium hydride is obtained from the hydrogenation of diethylmagnesium, an expensive reagent, at elevated temperature. It would be of advantage to provide a highly active magnesium hydride and a commercially feasible process for the production thereof.

SUMMARY OF THE INVENTION

This invention provides a magnesium hydride having high-surface area and high activity and a process for producing it. It has now been found that a highly active magnesium hydride is produced by hydrogenating a mixture of magnesium and certain conjugated alkadienes in the presence of tetrahydrofuran at superatmospheric pressure. Magnesium hydride thus obtained is extremely useful as a catalyst for hydrogenation processes, particularly those wherein unsaturated hydrocarbons, such as alkenes, alkadienes, and alkynes are hydrogenated.

DESCRIPTION OF PREFERRED EMBODIMENTS

The magnesium employed as a reactant in the process of the invention may be in any convenient particulate metallic form, as for example, pellets, granules, powder or fine turnings. Fine turnings is the preferred form. It need not be of high purity, but may be a magnesium metal derived from low-grade ore.

The conjugated diene employed as a reactant in the process of the invention is a conjugated alkadiene wherein the conjugated dienyl portion of the reaction is acyclic, i.e., is not contained within a ring system. Thus, the acyclic conjugated diene reactant of the invention includes substituted dienes where the substituents can be cyclic or acyclic. Preferably the substituents are hydrocarbyl radicals, i.e., alkyl, aryl, alkaryl, aralkyl, alkenyl, cycloalkyl, etc., radicals. While the process is generally applicable to $C_4$–$C_{16}$ conjugated dienes, particularly preferred are $C_4$–$C_{10}$ conjugated dienes. Typical examples of the conjugated dienes that may be used are butadiene, 2,3-dimethylbutadiene, 2-phenylbutadiene, 1,3-hexadiene, isoprene, 1,4-diphenylbutadiene, 1,3-octadiene and the like.

The process of the invention is characterized by the requirement for only low temperature and pressure. The reaction temperature can range from room temperature, i.e., about 25° C. to about 140° C. A temperature of about 90° C. is preferred. The hydrogen employed as reactant in the process of the invention is provided at superatmospheric pressure. A hydrogen pressure in the range of from about 500 to about 2000 p.s.i. is generally satisfactory, although hydrogen pressures from about 800 to about 1100 p.s.i. are preferred and a hydrogen pressure of about 1000 p.s.i. is especially preferred.

The molar ratio of the reactants of the process of the invention is not critical. The reaction is believed to be stoichiometric in the requirement of two moles of acyclic conjugated diene and an equimolar quantity of tetrahydrofuran for each gram-atom of magnesium reacting. However, there can be present any desired excess of either the conjugated diene or magnesium. Concomitantly, any excess of tetrahydrofuran over that equimolar with the conjugated diene reacting in the process functions as solvent for the process. When functioning as solvent, tetrahydrofuran is optionally employed in molar excess over the amount of the conjugated diene reacting, and, in general, moles of tetrahydrofuran solvent up to about 150 moles per mole of the conjugated diene reacting are satisfactory.

In a preferred embodiment of the invention, magnesium, butadiene and tetrahydrofuran are hydrogenated under a hydrogen pressure of 1,000 p.s.i. at about 90° C. Magnesium hydride and a mixture of octadienes, mainly, 1,7- and 1,6-octadiene are produced.

The acyclic conjugated diene reactant and the tetrahydrofuran are both necessary to the reaction if the highly activated magnesium hydride of the invention is to be obtained. The reasons for this are not fully known, but it is believe that the conjugated diene and the tetrahydrofuran form a complex magnesium intermediate which thereafter yields the high quality, high-surface area, highly active magnesium hydride of the invention. When, for example, a diene such as cyclopentadiene is used instead of the acyclic conjugated diene reactant of the invention, the reaction results only in the formation of dienylmagnesium and an alkene. Similarly, when some medium or solvent other than tetrahydrofuran is used alone, no magnesium hydride is produced. Therefore, when a solvent other than tetrahydrofuran is to be present, an amount of tetrahydrofuran at least equimolar with the conjugated diene reacting must also be used.

The high-surface-area and high-activity magnesium hydride of the invention is a finely divided solid, light white in color, with a surface area of from about 100 to about 200 m.$^2$/g. It reacts vigorously with protic reagents, such as ammonia, water or alkanol, e.g., methanol, to liberate hydrogen. It is particularly useful in catalyzing the hydrogenation of unsaturated materials, especially unsaturated hydrocarbons.

EXAMPLE I

To illustrate the preparation of magnesium hydride according to the invention, two grams (0.084 mole) of metallic magnesium, 120 mmoles of 1,3-butadiene, and 60 ml. of tetrahydrofuran were pressured with 1000 p.s.i. of hydrogen in an autoclave at 90° C. for 6 hours. The resulting magnesium hydride was centrifuged from the solvent, washed with additional tetrahydrofuran, and high-vacuum-dried at 120° C. The product had a surface area of 100 m.²/g. and was a light-white, pyrophoric powder which reacted vigorously with water with the evolution of hydrogen. An analysis of the active hydrogen of this magnesium hydride by treatment with water yielded 1.94 mmoles hydrogen (calculated 2.0 mmoles) per mmole $MgH_2$ according to the equation $$MgH_2 + 2H_2O \rightarrow Mg(OH)_2 + 2H_2$$

The supernatant liquid from the above-mentioned centrifugation was distilled yielding 30 mmoles of octadiene. Gas-liquid chromatographic (GLC) analysis indicated the octadiene to be a mixture of mainly 1,7- and 1,6-octadiene.

EXAMPLE II

To illustrate the criticality of the acyclic conjugated diene, Example I was repeated using an equivalent amount of cyclopentadiene instead of 1,3-butadiene. The products were butene and dicyclopentadienylmagnesium as contrasted with magnesium hydride and octadiene in Example I.

EXAMPLE III

To an autoclave containing 100 mmoles of 1,3-pentadiin 40 ml. of tetrahydrofuran was added 10 mmoles of magnesium hydride prepared according to Example I. The autoclave was pressured to 1700 p.s.i. with hydrogen and heated at 185° C. for 1 hour. GLC analysis indicated a 65% conversion of pentadiene to hydrogenated products with a selectivity of 77% to 2-pentene, 3% to 1-pentene, and 20% to n-pentane.

We claim as our invention:

1. A process for producing magnesium hydride having high-surface area and high-chemical activity comprising reacting a mixture of magnesium, a conjugated diene wherein the conjugated dienyl portion of the reactant is acyclic, and tetrahydrofuran with hydrogen at superatmospheric pressure.

2. The process of claim 1 wherein the conjugated diene is a $C_4$ to $C_{16}$ conjugated diene.

3. The process of claim 2 wherein said diene is butadiene.

4. The process of claim 1 conducted at a temperature of from about 25° to about 140° C.

5. The process of claim 1 wherein the hydrogenation takes place under a hydrogen pressure of about 500 to about 2000 p.s.i.

6. The process of claim 5 wherein the diene is butadiene.

References Cited
UNITED STATES PATENTS

| | | | |
|---|---|---|---|
| 2,392,545 | 1/1940 | Pechet | 23—204 |
| 3,485,585 | 12/1969 | Snyder | 23—204 |
| 3,591,339 | 7/1971 | Vit et al. | 23—204 |

OSCAR R. VERTIZ, Primary Examiner

G. O. PETERS, Assistant Examiner